United States Patent [19]

Ahmed

[11] Patent Number: 4,710,877
[45] Date of Patent: Dec. 1, 1987

[54] DEVICE FOR THE PROGRAMMED TEACHING OF ARABIC LANGUAGE AND RECITATIONS

[76] Inventor: Moustafa E. Ahmed, Dept. of Electical Engineering Worcester Polytechnic Institute, Worcester, Mass. 01609

[21] Appl. No.: 726,060

[22] Filed: Apr. 23, 1985

[51] Int. Cl.⁴ .................. G06F 15/20; G06F 15/38
[52] U.S. Cl. .................. 364/419; 364/900; 434/157
[58] Field of Search ............. 364/419, 200 MS File, 364/900 MS File, 513, 513.5; 434/156–157, 167, 185; 400/109–111

[56] References Cited

U.S. PATENT DOCUMENTS

| | | | |
|---|---|---|---|
| 3,828,446 | 8/1974 | Mandel | 35/35 C |
| 3,938,099 | 2/1976 | Hyder | 364/900 X |
| 3,983,639 | 10/1976 | Podkopaev et al. | 35/9 A |
| 4,060,848 | 11/1977 | Hyatt | 364/200 |
| 4,144,656 | 3/1979 | Podkopaev et al. | 35/9 A |
| 4,158,236 | 6/1979 | Levy | 364/900 |
| 4,170,834 | 10/1979 | Smart | 35/35 C |
| 4,176,974 | 12/1979 | Bishai et al. | 400/111 |
| 4,193,119 | 3/1980 | Arase et al. | 364/900 |
| 4,218,760 | 8/1980 | Levy | 364/900 |
| 4,238,893 | 12/1980 | Komatsubara | 434/351 |
| 4,310,317 | 1/1982 | Nomura et al. | 434/319 |
| 4,337,375 | 6/1982 | Freeman | 179/15 A |
| 4,355,370 | 10/1982 | Yanagiuchi | 364/900 |
| 4,380,438 | 4/1983 | Okamoto | 434/157 |
| 4,381,551 | 4/1983 | Kanou et al. | 364/900 |
| 4,417,319 | 11/1983 | Morimoto et al. | 364/900 |
| 4,438,505 | 3/1984 | Yanagiuchi et al. | 364/900 |
| 4,484,305 | 11/1984 | Ho | 364/900 |
| 4,489,396 | 12/1984 | Hashimoto et al. | 364/900 |
| 4,507,734 | 3/1985 | Kaldas | 364/419 |
| 4,567,573 | 1/1986 | Hashimoto et al. | 364/900 |
| 4,584,667 | 4/1986 | Hashimoto et al. | 364/900 |
| 4,593,356 | 6/1986 | Hashimoto et al. | 364/419 |

Primary Examiner—Gary V. Harkcom
Attorney, Agent, or Firm—Norman S. Blodgett; Gerry A. Blodgett

[57] ABSTRACT

A computerized device to teach the basics of the Arabic language and the rules of the recitation of the Qur'an meeting the particular requirements of the Arabic language and the Qur'anic phonetics and script in a convenient and simple manner. The device is provided with Arabic voice synthesis capability using linear prediction coding data and firmware and software pronunciation rules to conserve memory, as well as color graphics and animation capability and an interface to a color television set to add attractive and interactive learning capability. Different sizes of Arabic letters and a complete set of Arabic modifiers are implemented. The device uses variable-length dot matrixes to achieve high quality Arabic letter fonts for the Qur'anic script. A memory conserving graphics protocol is disclosed. The device uses a simple hand-held remote keyboard (eight key or less) for complete operation and is programmable through solid state software memory modules.

22 Claims, 51 Drawing Figures

Fig.1 Remote Keyboard.

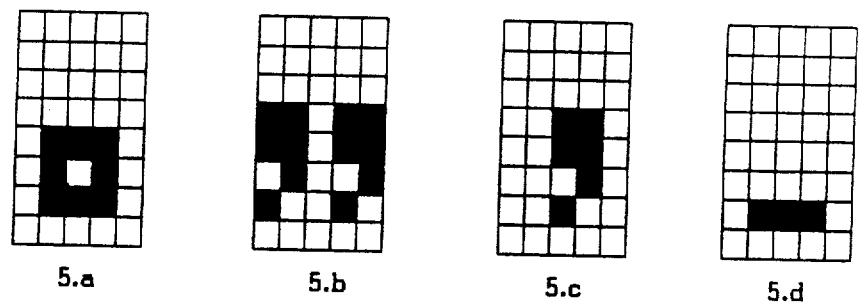
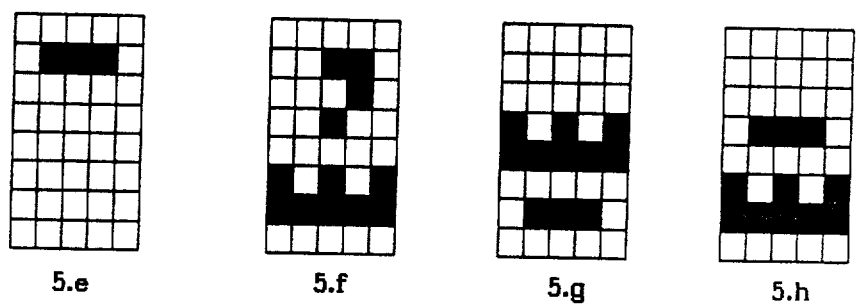
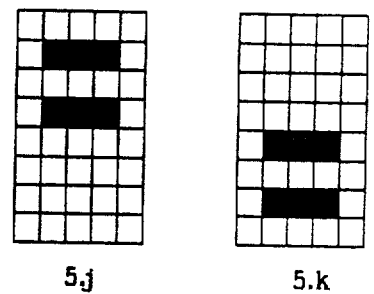
Fig. 5

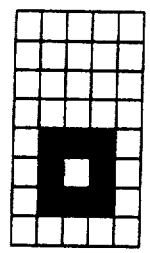
6.a
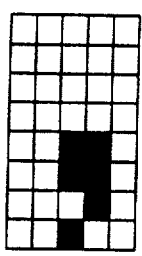
6.b
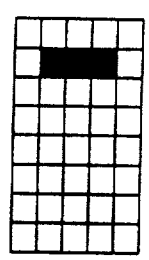
6.c
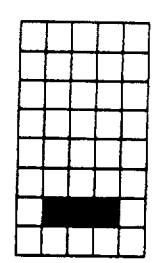
6.d
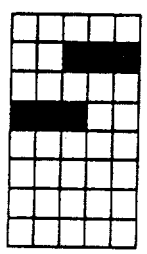
6.e
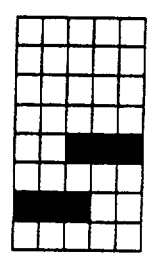
6.f
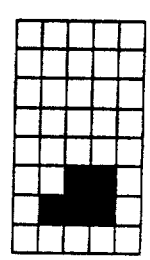
6.g
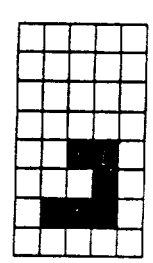
6.h
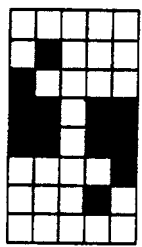
6.j
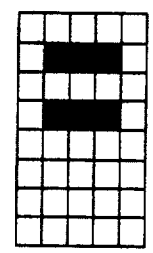
6.k
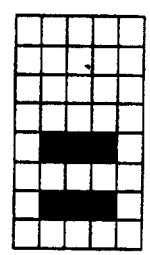
6.l
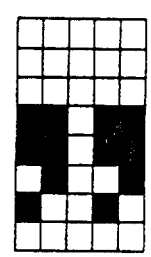
6.m
Fig. 6

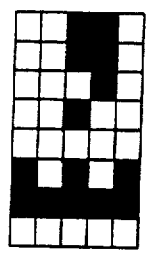
7.a
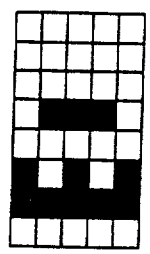
7.b
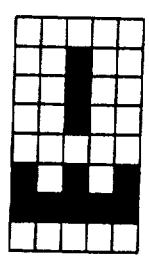
7.c
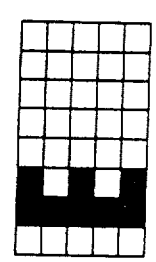
7.d
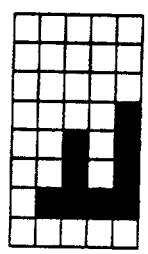
7.e
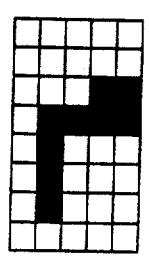
7.f
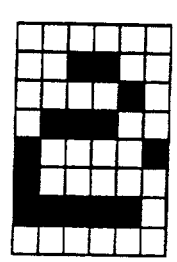
7.g
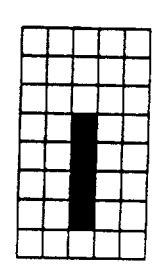
7.h
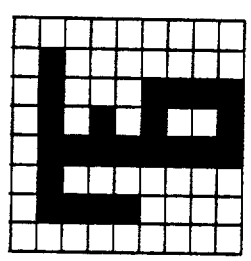
7.j
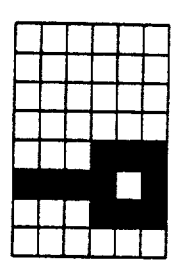
7.k
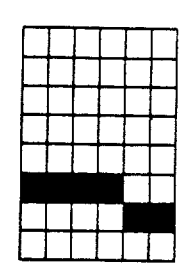
7.l
Fig. 7

8.a    8.b

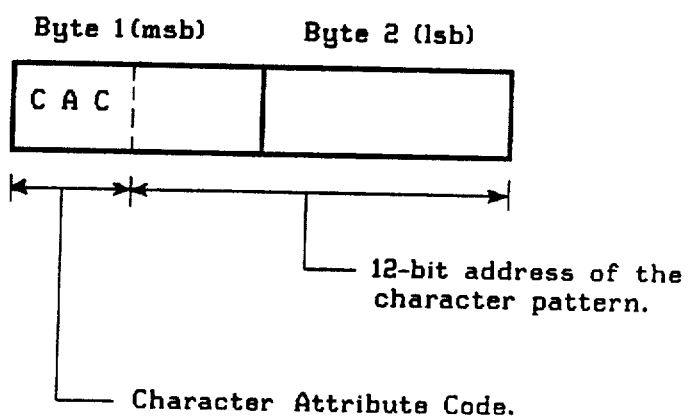
Fig. 10 A data segment in a character code-address table.

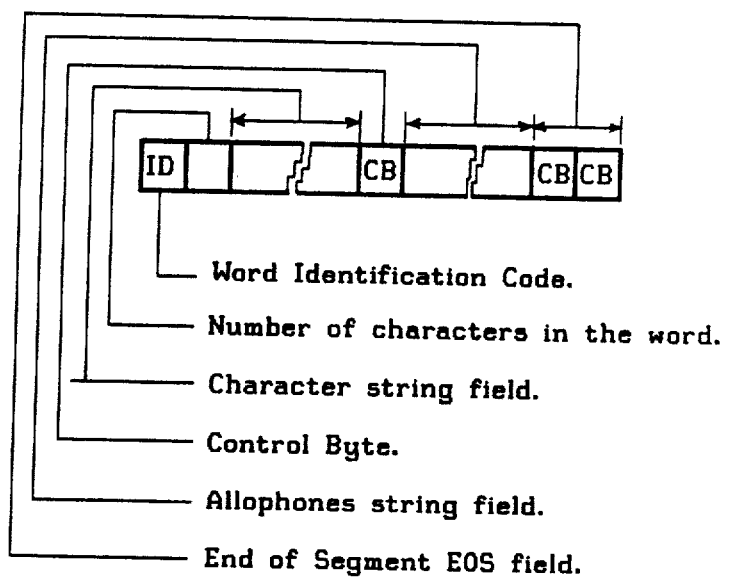
Fig. 11 A data segment in the AWF.

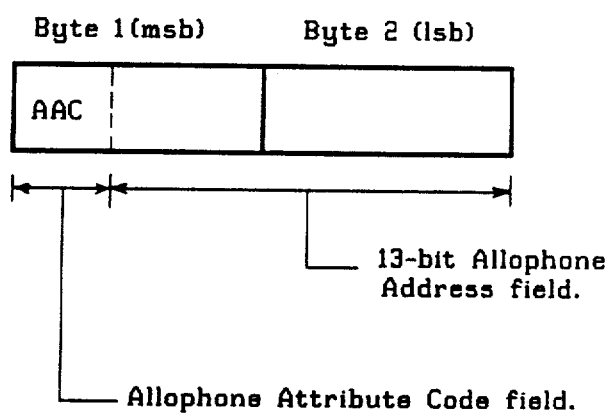
Fig. 12  A Data Segment in the Allophone Code-Address Table.

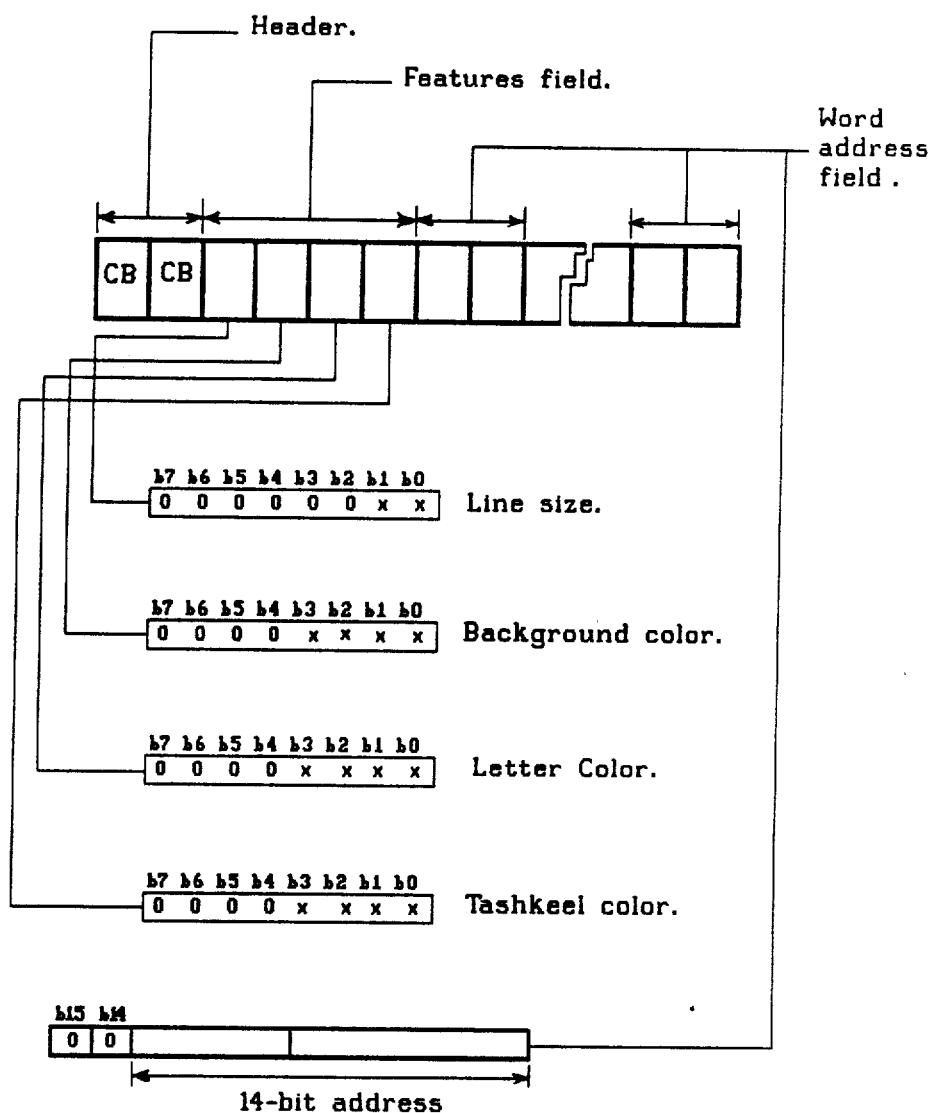
Fig. 13 Format of a data segment in the Visual Messages File VMF.

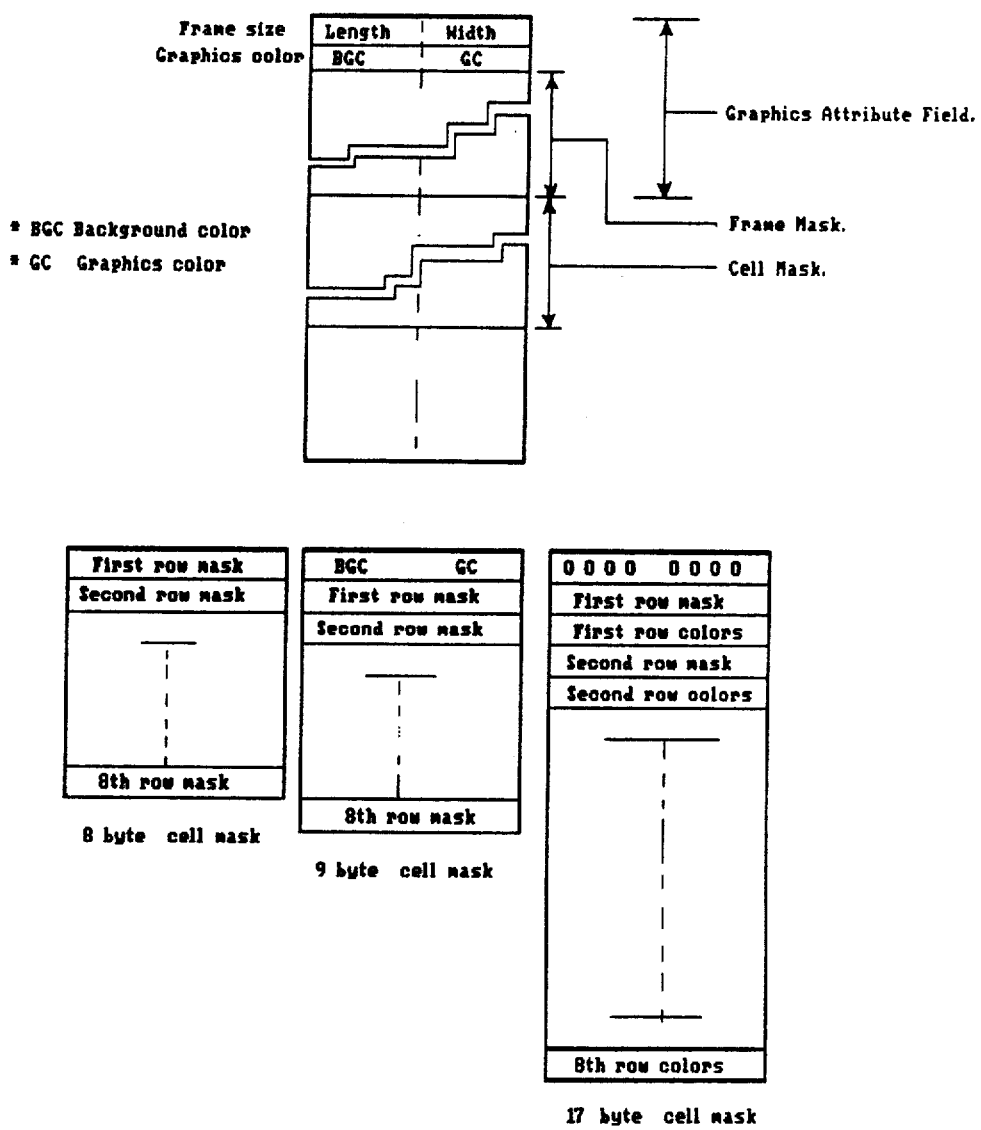
Fig.14 Format of a Data Segment in the Graphics file.

DEVICE FOR THE PROGRAMMED TEACHING OF ARABIC LANGUAGE AND RECITATIONS

BACKGROUND AND SUMMARY OF THE INVENTION

The purpose of this invention is to present a computerized programmable interactive Arabic language teaching device to help Arabic speaking children and adults to learn the basics of the Arabic language and recitation of Qur'an. The invention is also a very powerful self-teaching machine of Arabic language for non-Arab children and adults. The invention familiarizes the user with the different versions of the Arabic letters and their modifiers, enables the user to hear the correct Arabic letters and their sounds, and exercise spelling; teaches Arabic grammer, reading sentences and stories, and the Qur'anic recitaton rules. The invention has potential market in the Middle-East as well as all over the world as hundreds of millions of muslims learn the recitation of Qur'an and the basics of the Arabic language as part of their religion. With the addition of such sectors of the world-wide market, hundreds of thousands of sets may be marketed. In the U.S.A and Canada alone a market of at least 30 thousand pieces is predicted. Although the invention may sound similar in function to some English teaching toys, this invention in fact utilizes a unique design and theory of operation to accomodate the particular requirements of the Arabic Language and its phonetics. In the first place, the Alpha numeric keyboard with its 50 to 70 keys of multi-names and functions, which confuses even the experts, is eliminated. On the other hand the Arabic language is similar to the French in the sense that modifiers or accents like "'", "w", "o", """ over and under the letters modify the pronunciation of words and their meaning, hence these modifiers should be shown for proper pronunciation of words. The Arabic text is always written from right to left in a connected form. Writing in discrete letters as in English is not acceptable. Moreover, the Arabic letters are graphic-type and can not be accomodated in multi-segments display. Even fixed dot matrices sabotage the symmetry of the Arabic letters and produce poor quality font. The invention utilizes a variable width dot matrix technique to generate high quality Arabic fonts suitable for the Qur'anic script. The synthesis of the Arabic words is based on a set of allophones and syllables developed by the inventor as a result of almost two years of research work on linear prediction coding of Arabic speech and phonetics.

The teaching procedure implemented in this invention has been selected after deliberate consultation with many experts and institutions in the Arabic language education, and after reference to many literatures on the phonetics of the recitation of Qur'an, and the modern techniques of language teaching. In this invention we describe the details of a preferred embodiment. For ultimate convenience and simplicity of operation, the embodiment utilizes a TV set to provide a voice channel and a low-cost colorful large display area, a simple hand-held remote keyboard, and plug-in solid state software modules.

The disclosure below will discuss the forms of the Arabic letters and modifiers, the phonetics of the Arabic language, some rules of pronunciation, and how they infulence the device structure from the point of view of the hardware and software implementation. There follows a general description of the invention and its operation procedure. The remainder of the disclosure is devoted to the detail description of the hardware, the data structure, and the internal operations.

BRIEF DESCRIPTION OF THE DRAWINGS

FIGS. 5a–5h and 5j–5k show dot patterns of the modifiers used in the modern Arabic language.

FIGS. 6a–6h, 6j–6m, 7a–7h, 7j–7l and 8a–8b, show dot patterns of modifiers and punctuation marks used in the Qur'anic script.

FIG. 10 shows a Data Segment in a Character Code Address Table.

FIG. 11 shows a Data Segment in the Arabic Word File.

FIG. 12 shows a Data Segment in the Allophone Code Address Table.

FIG. 13 shows a Data Segment in the Visual Message File VMF.

FIG. 14 shows format of a Data Segment in the Graphics File.

Table 1 shows the Arabic letters, their names, and English words having similar sounds.

Table 2 shows some forms of the Arabic letters.

Table 3 shows signs of the Arabic modifiers.

Tables 4a–4c show the set of English-Arabic Allophones.

DETAILED BACKGROUND OF THE INVENTION

ARABIC LETTERS AND THEIR FORMS

Figure 3:
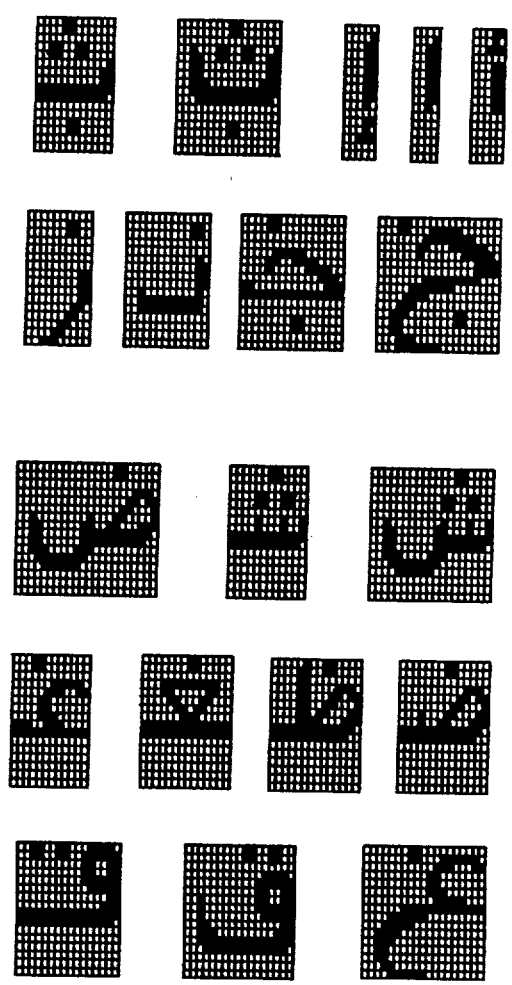
FIGS. 3 & 4 show the general dot pattern of the Arabic letters.
Figure 4:
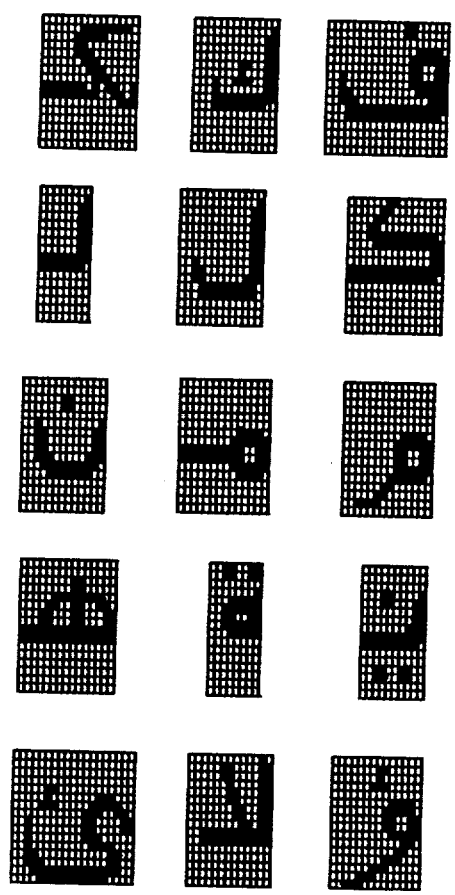

The Arabic letters together with their nearest English words having the same sounds are given in table 1. Unike the English language, the Arabic text is written from right to left and the Arabic words are not writable in descrete letters, letters must be written connected word by word. Accordingly, the Arabic letters may take different forms depending on their position in a word. For example, the letter 'Ain, labelled "an" in table 2, when it comes at the beginning of a word it takes the form (an-2) in table 2. While in the middle of a word it is written as shown in (an-3), and at the end of a word it takes the form (an-4). The invention familiarizes the user with the possible forms of letters and where to use them. Table 2 shows the Arabic letters and some of their forms, while FIGS. 3 and 4 show their general dot pattern.

1. Short Vowel Modifiers:

Short vowel modifiers or signs are three, Fat'hah, table 3-1; Kasra, table 3-2; and Dammah, table 3-3. Fat'hah and Dammah are placed over letters, while Kasra is placed under the letters. Fat'hah, Dammah, and Kasra are similar to the vowel sounds /a/, /u/, and /i/ respectively. Short vowels should be pronounced in a sharp and recognized manner. A sign of sukeen, table 3-4 over a letter indicates that the letter should be pronounced unvoweled.

2. Long Vowels (Maddah Letters):

The long vowel letters are Waw; "o" in table 3; Y'a, "y" in table 2; and Alif, "a" in table 2. The long vowel /ū/ is pronounced provided that the letter waw is modified by sukkeen, and the preceding letter bears Dammah. Similarly the long vowel /ī/ is pronounced if the letter Y'a, "y" in table 2 is unvoweled and the preceding letter is modified by a Kasra, table 3-2. The long vowel /ā/ is formed if an Alif, "a" in table 2, is preceded by a letter voweled by a Fat'hah, table 3-1. The point of articulation of the long vowels is the hollow portion of the mouth. During their pronunciation exhaling occurs and, therefore, their pronunciation depends on the air being exhaled. While the exhaling continues, the sound of these vowels continue. The length of a long vowel is normally equal to two short vowels. If the letters Y'a or waw are voweled but the preceding letter is voweled by Kasra or Dammah respectively then the long vowel sound is not pronounced. The length of a long vowel is normally equal to two short vowels.

3. Signs of Repeated Letters (Tashdeed signs):

A repeated letter modifier over a letter indicates that this letter is doubled. The first letter is unvoweled, and the second letter is voweled. Accordingly, there are three signs of repeated letters depending on the vowel of the second letter. The modifier shown in table 3-5 over a letter indicates that the letter is doubled, the first letter is unvoweled, and the second letter is modified by the Fat'hah, the /a/ vowel. Similarly the modifiers shown in table 3-6 and 3-7 imply that the letter is doubled. The first letter is unvoweled, while the second letter is modified by the vowel /i/, or /u/ respectively.

4. Signs of /n/ (Tanween signs):

Tanween is an extra "an", "en" or "on" suffix sound that appears at the end of a word if its last letter is modified by one of the three modifiers shown in table 3-8, 3-9 and 3-10 respectively. The pronunciation of Tanween may be influenced by the first letter of the next word. The rules governing the pronunciation of Tanween will be discussed in the subsequent chapters.

Figure 8:
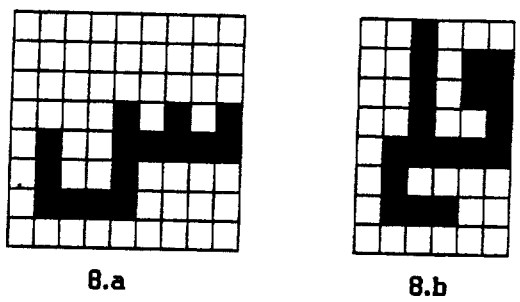

5. Additional Signs For the Qur'anic Script:

The set of signs and modifiers of the Qur'anic script is more sophisticated than the set used in the Arabic script now. The need for additional set arised from the fact that the original scripts of Qur'an, when they were written by the companion of the prophet, had no dots nor vowel signs. The correct pronunciation was propagated orally. Later on the sholars introduced the dots and the different modifier signs in such a way that the recitation of Qur'an be exactly in the same way and the same dialect of the prophet, in the mean time the Qur'anic scripts be kept the same as the original scripts. Some of these modifiers have been explained earlier in this introduction, the following are some of these unique modifiers of the Qur'anic script, FIGS. 6, 7 and 8. For example, a small circle over Alif implies that this Alif is written in the original script but should not be pronounced. A small o over Alif followed by a voweled letter indicates that this Alif is pronounced only if there is no stop at this Alif. However, if there is a stop it should not be pronounced. If there is not any sign or modifier over a letter, and the following letter is doubled, the first letter should be completely assimilated in the second. Small letters are also used to indicate the position of letters which should be pronounced, especially vowels, nevertheless these letters were not written in the original scripts or they were substituted by another letter. These few cases are similar to the pronunciation of the English words "rough" and "age" wherein the first the "gh" is pronounced "f", whereas in the second case a "d" sound is introduced before "g".

Basics of the Arabic Phonetics

Knowledge of the Arabic Phonetics is an essential knowledge in the development of this invention, as well as an essential background for the preparation of the teaching materials on this device. Although the basics of the Arabic phonetics may not be included in the introductory levels, the device, as an expert teacher, should itself enunciate the Arabic sounds from their correct points of articulation. Moreover, the rules of Arabic pronunciation are extensively used internally by the device to generate the proper sequence of allophones from the coded words and sentences. Thus, this know-how is not only important to prepare the teaching materials, but for efficient design of the data structure and efficient utilization of memory space as well.

1. Gutteral letters:

There are six guttural letters; Hamzah, "aa" in table 2; Ha'a, "h" in table 2; Ain, "an" in table 2; Ghayn, "gh" in table 2; Kha', kh in table 2; and Ha', "ha" in table 2. Hamzah and Ha'a are pronounced from the back of the throat, Ain and Ha' are pronounced from the middle of the throat. Ghayn and Kha' are pronounced from the front of the throat.

2. Tongue Letters:

From the back of the tongue and the upper part of the glottis and from the interior side of the uvula Qaf, "q" in table 2, is pronounced. From the same points of articulation of Qaf, however a little more toward the front of the tongue, and from the front of the uvula Kaf, "k" in table 2, is pronounced.

Jīm, "j" in table 2; sheen, "sh" in table 2; and Ya'a, "y" in table 2, are pronounced from the middle of the tongue. Dad, "dh" in table 2, is uttered from the left blade of the tongue and left upper molar teeth. Dad also can be pronounced from the right side using the right blade of the tongue and the right upper molar teeth. Lām, "l" in table 2, is produced from the tip of the tongue and the gum of the upper incisor teeth. Nūn, "n" is produced from just inside the points of articulation of Lām. Ra'a, "r" in table 2, is pronounced from just inside the points of articulation of Nūn. From the tip of the tongue and the edge of the upper incisor teeth. Tha'a, "th" in table 2; Zhal, "zh" in table 2; and Zā'a, "Za" in table 2, are pronounced. The tip of the tongue must touch the edge of the upper incisor teeth and protrude slightly to be visible outside.

The letters Ta'a, "t" in table 2; Oāl, "d" in table 2; and Tā, "ta" in table 2, come from the tip of the tongue and the root of the upper incisor teeth.

Finally, Zay, "z" in table 2; Seen, "s" in table 2; and Sad, "sa" in table 2, are produced from the tip of the tongue and above the lower incisor teeth. In pronouncing these letters, the air is exhaled in a soft blow. If exhalation is not continued, the pronunciation will not be correct.

3. Lips Letters:

By bringing the lips together Bā, "b" in table 2; Meem, "m" in table 2; and Waw, "o" in table 2; are pronounced. In pronouncing Waw the two lips come together and project forward. By touching the lower edge of the upper teeth to the inside of the lower lip, the letter Fa'a, "f" in table 2 is pronounced.

4. Nasal Letters:

Nasal sounds are produced in the nasal cavity Meem, "m" in table 2; and Num "n" in table 2, when doubled with tashdeed and tanween modifiers, "8", "9" and "10" in table 3, are pronounced in the nasal cavity. The duration of the pronunciation of the nasal sound "Ghonnah" is equal to two measures of a Harakah, or one short vowel as that of one Alif.

The Arabic letters are also characterized by a set of essential or basic attributes and about twenty or more secondary attributes. A full discussion of this topic is beyond the scope of this invention.

Fundamentals of the Arabic Language Pronunciation Rules

English language has been a subject of intensive study in a variety of linguistics fields as Phonemics, Phonetics, and Semantics. The recent advance in the electronic signal analysis techniques and in computer has led to a frog-leap in the understanding of the acoustic nature of the English sound and the mechanism of its production. As a result of that progress a variety of electronic products were developed, as speech synthesis chips, language synthesizers based on the English Allophone set, text-to-speech devices, and continuous speech recognition machines. Similar achievements are now also in progress in other languages such as Japanese, French and German. This invention discloses an Arabic allophone set which was developed by the inventor as a result of almost two years of research work on linear prediction coding of the Arabic language, and the Arabic text-to-speech rules. The invention discloses also a set of Arabic language pronunciation rules based on the said Arabic allophones.

1. The Arabic Allophones:

The sounds of a language are called Phonemes, and each language has a set which is slightly different from that of other languages. Consonents are produced by creating a construction or occlusion in the vocal tract which produces and aperiodic source. If the vocal cords are vibrating in the same time, as is the case of the voiced fricatives /zz/ and /vv/, there are two sources; one which is aperiodic and one which is periodic. Vowels are produced with relatively open vocal tract and a periodic sound source provided by the vibrating vocal cords. Vowels are classified according to whether the front or back of the tongue is high or low, whether they are short or long, and whether the lips are rounded or unrounded. Phoneme is the name given to a group of similar sounds in a language, and are acoustically different depending upon the word position. Each of these positional variants is an "Allophone" of the same Phoneme. The inventory of the English sounds contains 64 allophones. Some of the sounds in the English language are also common to the Arabic language, however, there are also few phonemes in the Arabic language that don't exist in the English set. Tables 4a–4c disclose the combined set of the Arabic and English allophones as developed by the inventor. Speech words can then by synthesized by concatenating individual speech sounds. Each allophone requires at most one identification code byte. In the average 4 to 7 allophones would be required to store the sound of a word. Moreover, by programming the following few pronunciation rules, the sound of most of the Arabic words can be generated from the string of the letter/modifier characters code, without having to store the allophones code. It should be understood that the following set of rules is given only here for the purpose of illustration. In fact some of the rules have been simplified for economic reasons. However, a complete coverage of this subject matter is outside the scope of this invention.

2. Some Pronunciation Rules Based on the Arabic Allophones:

1. If a letter (except, the Arabic letters labelled q, ta, n, rh, gh, dh, za, y, o, and a in table 2) is modified by Fat'hah, table 3-1, and the next letter is not one of the letters a, y, o in table 2; the allophone vowel /AE/ sould follow the allophone of the letter.
2. If one of the letters q, ta, r, gh, za, dh, kh in table 2 is modified by Fat'hah, and the next letter is not a, y, o shown in table 2, the allophone /AH/ follows the letter.
3. If any letter (except y in table 2) is modified by a Kasra, table 3-2, and the next letter is not a, y, or o in table 2; the allophone /IH/ comes after the letter.
4. If a letter (except q, ta, r, kh, y, o, dh, za, gh of table 2) is modified by Dammah, table 3-3, and the next letter is not a, y, or o of table 2; then the vowel /UH/ comes after the letter.
5. If one of the letters v, ta, r, kh, gh, dh, za is modified by a Dammah, table 3-3; and the next letter is not a, y or o of table 2; the short vowels /AA/ or /AO/ may come after the letter.
6. If a letter (except v, ta, r, kh, gh, dh, za, y, o, or a of table 2) is modified by a Fat'hah, table 3-1, and the next letter is Alif a in table 2, the letter should by followed by two /AE/ vowels.
7. If one of the letters v, ta, r, kh, gh, dh, za is modified by a Fat'hah, table 3-1, and the next letter is Alif, a in table 2; the letter may be followed by the long vowel /AH$^2$/ or two /AH/.
8. If a letter is modified by a Kara, table 3-2, and the next letter is unvoweled y in table 2; the letter may then be followed by two short vowels /IH/ or the long vowel /IY/.
9. If a letter (except q, ta, r, kh, gh, dh, za, y in table 2) is modified by a Dammah, table 3-3, and the next letter is the unvoweled waw, o in table 2; the letter may then be followed by two short vowels /UH/ or the long vowel /UW$^2$/.
10. If one of the letters v, ta, r, kh, gh, dh, za is modified by a Dammah, table 3-3, and the next letter is the unvoweled waw, o in table 2; the letter may then be followed by two short vowels /AA/, or two /AO/, or the long vowel /OW/.
11. If a letter is modified by a double letter sign (tashdeed), the first letter shall be unvoweled, while the second letter shall be voweled according to the type of the double-letter sign, and according to the rules mentioned before.
12. The Allophone /LL1/ is used only in the glorious name of God "Allah". The Fat'hah vowel after /LL1/ should be the short vowel /AH/. If the glorious name of God is preceded by the vowels /IH/ or /IY/, then the regular /LL/ should be used in the word "Allah".
13. If for particularization an Alif, a in table 2; and Lam 1 in table 2; are prefixed to any of the letters z, za, s, d, e, zh, t, r, sa, th, ta, sh; the sound /LL/ is not pronounced, while the next letter is doubled, e.g., Sun us written as Al-shamsu, but is pronounced Ash-shamsu. These letters are called shamsi letters.
14. If the speaker makes a stop at any word he may pronounce the last letter of that word unvoweled. This rule will apply regardless of the modifier on the last letter except when the modifier is the double letter sign in table 3-8. If a speaker stops at a word ending with this modifier, he must stop with a normal short Fat'hah vowel according to the rule stated before. To stop at the letter t-4 in table 2, the sound change from /TT2/ to /HH1/ or /HH2/ regardless of the modifier of /TT2/.

15. If any of the guttural letters kh, ha, gh, an, h, aa in table 2 comes after an unvoweled "Noon", n in table 2, the allophone /NN1/ should be used for the "n" sound.

16. /NN1/ is also used when the letter n in table 2 is voweled by Fat'hah or Kasra.

17. If the letter n in table 2 is voweled by Dammah, table 3-3, the allophone /NN2/ is normally used.

18. If a word ends by an unvoweled "Noon", n in table 2, or the end of the word is modified by a tanween suffix; and the first letter of the second word is also the letter n in table 2; then the first N sound is assimilated with the second. The combination sound is the long nasal resonant sound /NN3/ which is generated by forcing the air through the nose while the back of the tongue is touching the top of the mouth cavity.

19. If the last letter of a word is an unvoweled n in table 2 or the last letter of a word is modified by a tanween suffix; and the first letter of the second word is the letter m in table 2, then the first N sound is assimilated with the second M sound and the combined sound is the long strong nasal sound /MM2/.

20. If the last letter of a word is modified by a tanween sign or it is an unvoweled n in table 2; and the first letter of the second word is r in table 2; then the N sound is not pronounced and the new sound will be R-colored and doubled. The R-colored Allophone depends on the vowel preceding the N sound.

21. If the last letter of a word is modified by a tanween suffix sign or it is the unvoweled n in table 2; and the first letter of the second word is l in table 2; then the N sound is not pronounced and the L sound is doubled according to the regular rules of doubling.

22. If the letter b in table 2 comes after an unvoweled n in table 2 or a Tanween sound, the N sound is usually converted to the allophone /MM1/.

23. If any other letter than n, o, e, m, y, r in table 2 follows an unvoweled n in table 2 or a tanween suffix, it is suppressed and moved toward the next letter, i.e. the allophone /NG/ should normally be useed.

24. If any letter (except m and b in table 2) comes as the first letter of a word immediately following an unvoweled m in table 2, the allophone /MM2/ should be used for the M sound.

25. If an unvoweled m in table 2 is followed by the letter b in table 2 in another word, the pronunciation of the M sound is suppressed and the allophone /MM1/ should be used.

26. If the unvoweled M in table 2 is followed by a word starting with a voweled m in table 2; the first M sound is assimilated with the second M sound, the allophone /MM1/ should then be used for the combination.

3. Additional Rules for the Qur'anic Script:

In writing the Quar'anic script, the scholars have been very particular to indicate the punctuation marks, and to classify the types of stops in order to avoid any alteration of the meaning of Qur'an, and to ensure that the reading is performed exactly in the same dielect of the Arabs when the Qur'an was revealed. Hence, there are several punctuation marks pertinent to the Qur'anic text, and are not used in the ordinary Arabic Script. For example a small Meem, FIG. 7k, over the end of a word indicates a position of compulsory stop, while the sign in FIG. 7e indicates that no stopping is allowed at this position, and the recitor must continue. Sometimes a small Seen, FIG. 8a, is used to indicate a short pause without breathing. The small letter Jim, FIG. 7g, indicates that the speaker may or may not stop. The sign Sel, FIG. 7j, indicates that it is prefered not to stop at this position, and the sign #Qef, FIG. 8b, is used to indicate that the recitor may stop at its position. Finally, the two signs .'. - - - .'. separating a word or a sentence indicate interelated stop. If the speaker stops at one of these two signs he should not stop at the second. If the Qur'anic Script the signs shown in FIGS. 6j, 6k, and 6e are used to indicate a clear and sharp tanween. While the signs 6e, 6f, and 6m, if they come before a letter modified by Tashdeed (doubling), the tanween sound is assimilated with this letter. However the next letter is not modified by tashdeed, the tanween is hidden or suppressed. As mentioned before the signs of long vowels are the letters Alif, Ya'a and Waw, labelled "a", "y", and "o" respectively in table 2. If the duration of the sound of a vowel is longer than two short vowels, the sound is called prolonged vowel. The rules of prolonged vowels should be strictly followed in the recitation of Qur'an. However, prolongation is rarely used in the modern Arabic language. In the Qur'anic Script the position of a prolonged vowel is indicated by the sign in FIG. 7.1 over the letter. When a long vowel precedes a Hamzah letter, "aa" in table 2, in the same word, elongation of the vowel is compulsory. The duration of the compulsory prolongation is four or five the duration of a short vowel. However, if a long vowel comes at the end of a word and the Hamzah, in the form of Alif, is the first letter of the next word the prolongation is permissible provided that there is no stop between the two words. If a long vowel or a prolonged vowel is followed by an unvoweled letter or a letter modified by Tashdeed, the pronunciation of the vowel sound is called essential Madd. The duration of the essential Madd is six short vowels or 2 long vowels.

DETAILED DESCRIPTION OF THE PREFERRED EMBODIMENT

Figure 1:
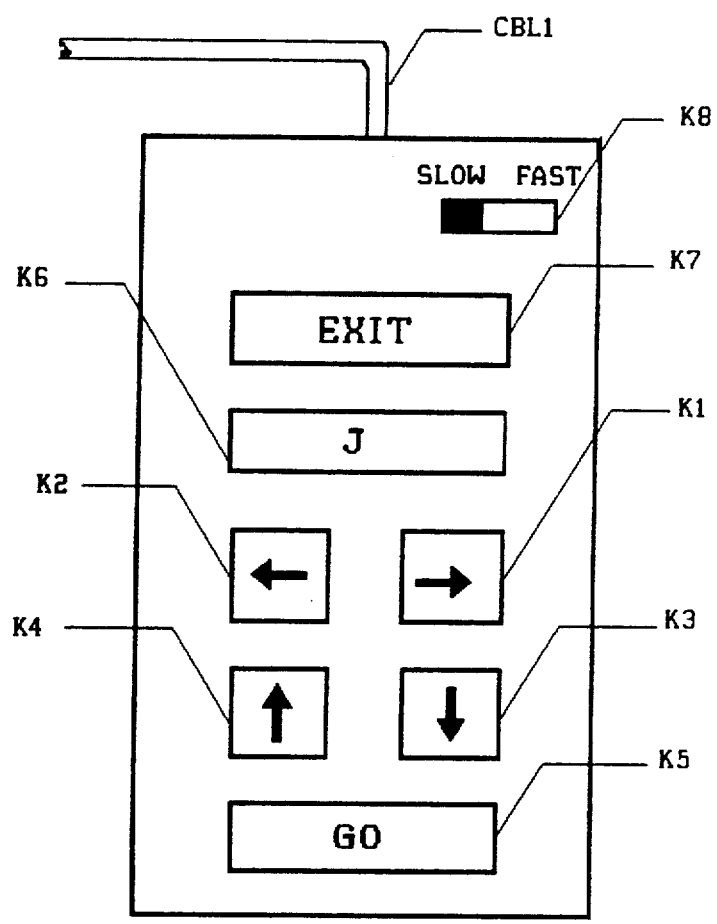
FIG. 1 shows the face of the hand-held remote keyboard.

In this preferred embodiment the display media is an ordinary color or black and white TV set. The TV set provides also a voice channel for sound and voice production. The input media is a remote hand-held small keyboard as shown in FIG. 1. The keyboard is connected to the main circuitry through Cable CBL 1. Since the major sector of the users of this embodiment are either children or adults with no previous knowledge of the Arabic letters or computers, a typewriter style keyboard will be very confusing and too complicated. The invention relies on extensive overhead software to make the operation as simple as possible. In fact, the device directs the user in every step through oral and visual messages and instructions. The user's decisions will be based on menues or multi-choice answers. With such operation philosophy, the need for multifunction typewriter keyboard is completely eliminated. A simple keyboard as shown in FIG. 1 will be adequate. The keys K1, K2, K3 and K4 are used to move an object on the screen; as an arrow, cursor, letter, symbol or text; in order to select an option. Key 5 the [GO] key, is used to tell the device that selection has been made, to proceed on in the current mode, or to request more information from the machine depending on the current mode of operation. Key K6, the [J] key, is a general purpose key and has different functions depending on the current mode of operation, e.g. repeat, pause, etc. Key 7, the [EXIT] key is normally used to quit the current mode and go back to the latest menu or mother mode. The slide switch K8 is used to select fast mode or slow mode. In the fast mode, the voice is synthesized at the normal speech rate, and a time limit to answer the questions is imposed. In the slow mode, the words will be uttered slowly, and there will be no time limit to answer questions. Keys K1 to K4 may have two modes of operation. A short depression on K1 causes the cursor or the object to move one step to the right. If the key is continuously depressed, the cursor or the object moves at a faster rate.

Figure 9:
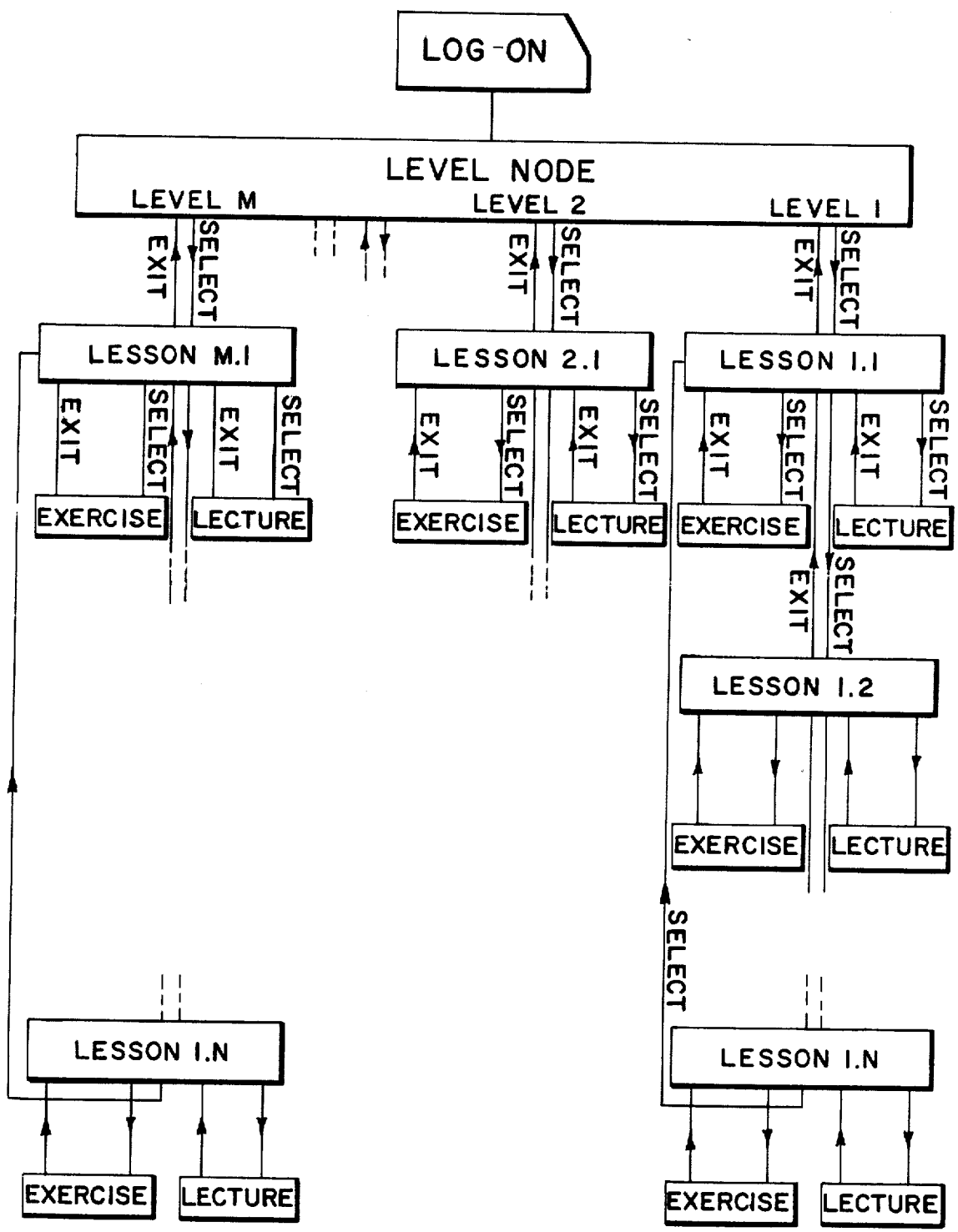
FIG. 9 shows the general structure of the teaching program.

The teaching program consists of several levels, each level consists of one or more lessons. Each lesson in turn consists of a lecture and a set of exercises. The exercise of a certain lesson is based on all the material of the previous lessons and previous levels in an increasing difficulty and comprehensiveness. When the system is turned on, the device, through its stored program initializes the hardware and checks for an external software module. If there is an external module it executes the software of the external module otherwise it proceeds to execute the basic teaching program stored in the on-board memory. Whether the device is executing the basic program or the software of an external module, the general structure of the teaching programs is the same. The teaching programs are structured in the form of a tree with branching nodes and operation branches or operation modes. In the branching nodes the user chooses between two or more options. Each operation branch may contain several nodes, however each branch starts and ends on a node. Thus unlike a tree, all branches are closed loops as shown in FIG. 9. Upon the start of execution of a teaching program, the device produces an oral and visual log-on message which identifies the teaching software. The machine then enters the Level Node LN as shown in FIG. 9.

In the LN node the machine displays the available levels with an arrow or object pointing to level 1 option as a default choice. The user may then manipulate Keys K1 to K4 to select the desired level. The user now presses the [GO] key to tell the machine to process his selection. If level 1 is selected, the machine proceeds to the node of the first lesson in level 1. Again here the user has to make a choice between several options. If he presses the [EXIT] key, the machine returns to the level node. Three other options will be displayed on the screen; to go to lesson 2, to hear a lecture on lesson 1 or to solve exercises on lesson 1. The choice is accomplished using the same technique as in the level node, namely, through the use of K1 to K4 and then pressing the [GO] key. The node of lesson 2 is similar to the node of lesson 1 in the sense that the user has four choices; to go back to the lesson 1, to proceed to lesson 3, to hear the lecture of lesson 2 or to practice some exercise on lesson 2. The technique is the same for all the lesson nodes. However, in the last lesson in a level, the user has the option to go back to the first lesson in this level.

In the lecture mode the machine normally goes one line of text by one line and pauses. The user can then press the [J] key to repeat or press the [GO] key to continue, or press the [EXIT] key to return to the previous page. However, continuous depression of the [EXIT] key may terminate the lecture and cause the machine to go back to the lesson node. If the machine is not in the pause position, the lecture can still be halted at any moment by using the [J] key, and the [GO] key to continue. The keys K1 to K4 can be used (in some situations) to go back and forth in the text. The lectures are enhanced by colorful graphics, sound effects, voice output, texts and animations to attract the attention of the user throughout the lecture.

The basic teaching software consists of 4 levels. Level 1 is devoted to acquaint the student with the names of the Arabic letters, their sounds, as well as some vocabulary which stresses the sounds of these letters. In level 2 the students learn the different forms of the Arabic letters and where to use them. Level 3 introduces the modifiers used in the normal Arabic language, and explains how these modifiers affect the sound of letters and the pronunciation of words, and consequently the meaning of words and sentences. Level 4 teaches the user how to form simple sentences and builds the vocabulary background.

External modules can be used for an unlimited number of applications. These applications include, but are not limited to recitation of Qur'an, basics of the Arabic reading, grammar, short stories, introduction to Science and Math, intellectual games and puzzles.

The basic module for Qur'anic recitation may consist of the following levels:

1. Revision of the letter sounds, vowels and modifiers.
2. Punctuation signs of Qur'anic script.
3. Rules of prolonged vowels, and rules of the /L/ sound.
4. Rules of unvoweled /N/ and Tanween.
5. Recitation of short verses and more rules.

As mentioned before, every lecture is accompanied by an exercise. The set of questions in an exercise will be randomly ordered upon each call of this exercise mode. The machine also assigns a grade for each question and accumulates the user's score as he/she proceeds in the exercise mode. If an answer is wrong, the machine sounds a buzzer, flashes a visual message or symbol, then produces an oral error message (in Arabic), "the answer is wrong—try again". On the other hand, if the answer is correct the machine sounds a bell and gives the message (in Arabic), "very good—the answer is correct", and displays the score before it proceeds to the next question. If the slide switch K8 is in the fast position, the machine allows a time limit to answer each question. If the time limit is exceeded the machine sounds a buzzer. The user may then press [GO] to proceed to the next question or press [J] to repeat the question, however the second and third trials will be penalized. In the slow mode the user may press the [J] key to repeat the question as many times as he wishes. In both cases the machine allows only 3 unsuccessful trials then gives the right answer.

The following types of exercises are recommended by the experts in the field of child education:

1. Complete a word:

In this type of question, a word is uttered and displayed, however, with one or two missing letters. The alphabet or a subset of it will be displayed in the bottom line of the screen. The position of the missing letter flashes until the user uses K1 to K4 to point to the expected letter and then presses [GO]. The computer places the letter on the flashing position.

2. Complete a sentence:

That is basically a multi-choice question in which a sentence is displayed with a missing word. Several possible words will also be displayed. The user uses again keys K1 to K4 to place a pointer on the possible correct word and presses [GO].

3. Spell a word:

The machine utters an Arabic word and asks the user to spell it. The Alphabet will be displayed on the bottom line, the position of the first letter in the word blinks until the user selects a letter and presses the [GO] key as in the first type of question. The second position then blinks and the user again uses K1 to K4 to select a letter and then presses [GO] and so on until the word is completed.

4. Find the word:

In this exercise the device utters an Arabic word and writes down on the screen several words which sound close to the uttered word. The user selects the correct word.

5. Find the object:

A picture is displayed and several words appear on the screen. The user matches the picture and word.

6. Order letters and sentences:

An unordered word or a sentence is displayed. The user moves the letters and words on the screen to reorder them.

7. Match:

Two columns of sentences or words are displayed and the user matches a sentence or a word from the left column to the best match on the right column.

8. Place mofifiers (Tashkeel):

A word is uttered and written on the screen without modifiers, the user adds modifiers to the word.

HARDWARE DESCRIPTION

Figure 2:
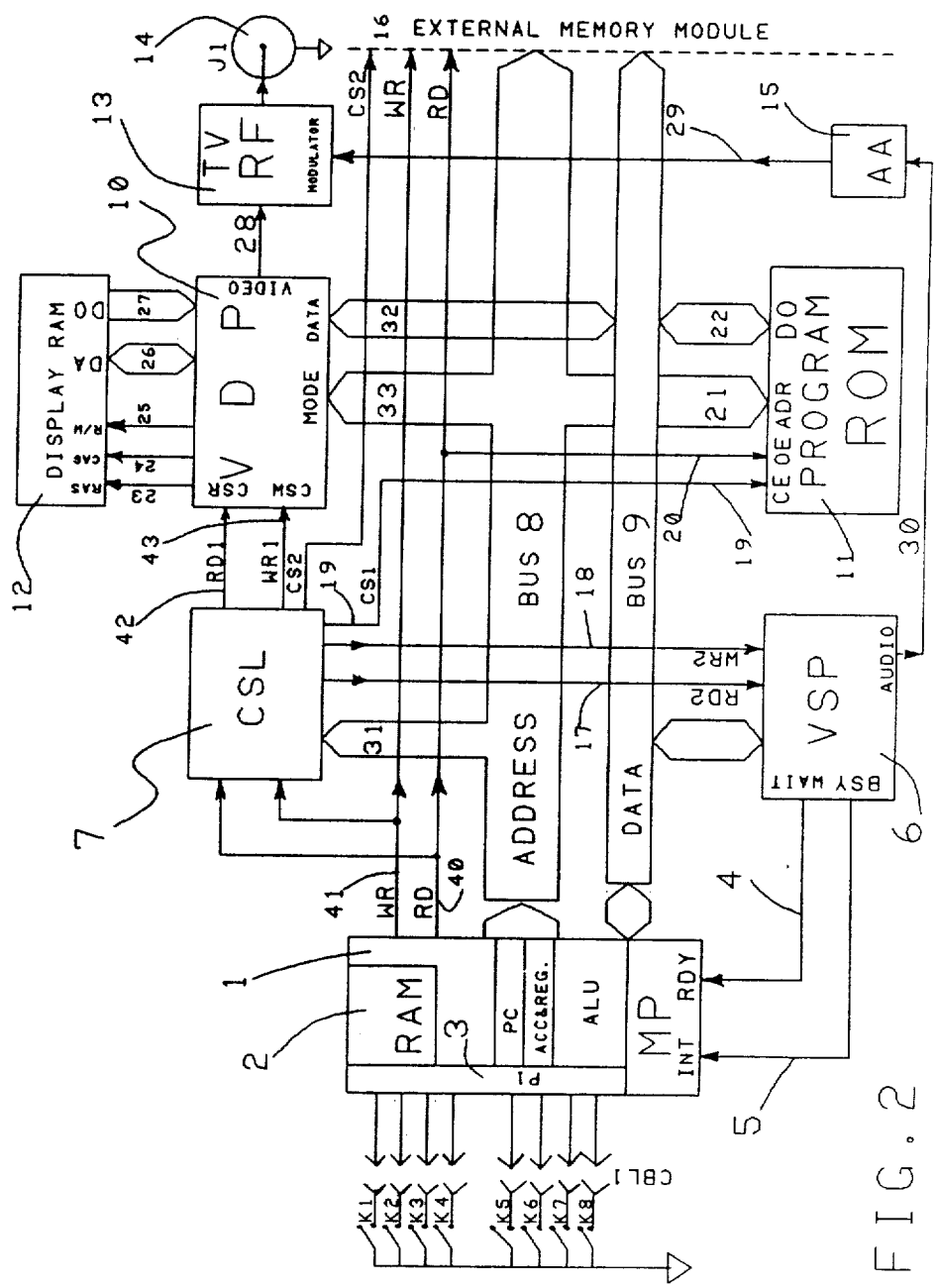
FIG. 2 is a block circuit diagram of a device according to the invention.

The detailed description and specific examples herein below, while indicating a preferred embodiment of the invention, are given by way of illustration only, since various changes and modifications within the spirit and scope of the invention become apparent to those skilled in the art from this detailed description. As shown in FIG. 2, the invention consists of a microprocessor MP 1 which contains a Program Counter, Accumulator, working registers, Stack Pointer, and Arithmetic and Logic Unit, a timing circuit, and control logic and condition flags. The program counter points to the address of the next instruction to be executed. The control and timing circuit in the MP resets the program counter and initializes the operation of the internal blocks after power on. It provides also all the signals for program execution and data transactions among the varous function blocks of the MP 1. The control and timing circuit contains also conditional branch logic and instruction decoding logic. The Arithmetic and Logic Unit ALU receives input from the Accumulator and a temporary register or external Data bus 9. The condition flags identify the conditions of the result of the operation performed in the ALU. The Random Access Memory RAM 2 is made up of a data storage section for program variables, a memory stack for program nesting, and a working area for data manipulation.

The MP communicates with the outside world through an Address Bus 8, a Data Bus 9, control lines $\overline{WR}$, $\overline{RD}$, $\overline{INT}$, and $\overline{RDY}$ and an Input Port PI 3. The direction of the flow of data from the MP to the support chips is governed by the two output lines $\overline{RD}$ 40 and $\overline{WR}$ 41. If $\overline{RD}$ is low and data flows from the data bus to the MP while if $\overline{WR}$ is low the data is output from the MP to the data bus. PI is an 8 bit input port. The input pins are normally pulled up to the high state and connected through Cable CBL 1 to the remote keyboard. CSL 7 is a chip select logic which accepts the MP $\overline{WR}$ and $\overline{RD}$ signals, and the most significant bits of the address lines, and generates chip select signals for the various memories and support chips.

CS1 19 is an asserted low signal which enables only the basic program Read Only Memory ROM 11, RD1 42, and WR1 43 are asserted low control signals to REad and Write from/to the Video Display Processor VDP 10. The control lines WR2, and RD2 are used to perform write and read operations to/from the Voice Synthesis Processor VSP. Finally the CS2 signals are used to enable the external software ROM modules and/or any other external accessories.

The VSP 6 is a voice synthesis processor which accepts the linear prediction codes LPC of the voice to be synthesized and provides an audio signal 3. The audio signal is buffered and filtered by the audio amplifier AA 15, and fed to the audio signal input of the TV radio frequency modulator 13. The VSP 6 communicates with the MP through the data bus 9 and the control signals RD2, WR2, $\overline{INT}$ 5 and $\overline{RDY}$ 4. The signal WR2 is asserted low only when the MP is sending data to the VSP. RD2 is low when the MP is requesting data from the VSP. The output signal BSY 5 from the VSP is high to indicate that the VSP is busy processing the last set of the LPC parameters and cannot accept any more data at the moment. When the VSP becomes ready to accept a new set of LPC parameters, the signal line 5 is asserted low, which may then cause interrupt to the MP. During normal operation the hardware interrupt input $\overline{INT}$ of the MP is disabled by software unless an audio message is to be produced, and the MP is ready to send continuously the LPC parameters of the Allophone or the tone to be generated. The interrupt input $\overline{INT}$ is disabled as soon as the audio message is completed. The VSP output $\overline{WAIT}$ signal is connected to the Ready $\overline{RDY}$ input of the MP. When this signal is low the MP stretches its read and write timing to allow for the slow access time of the VSP. The device internal Read Only Memory ROM 11 is enabled by the chip select line CS1 19. The CS1 is connected to the $\overline{OE}$ input of the ROM. When CS1 is high, the output drivers of the ROM 11 go into their high impedance tristate. The device ROM 11 consists of the following major sections:

1. A small operating system program. The operating system contains utility programs to initialize and operate the VSP, the VDP, and the keyboard. It also contains programs to display prestored graphic patterns, character generation from text code, and allophone string generation.

2. Character Pattern File. This is in fact a character generation ROM which contains variable-length two demension matrices of the dot patterns of the Arabic characters and some symbols. Some of these character patterns are shown in FIGS. 3 to 8.

3. File for the Arabic Allophone/syllables and their LPC coefficients.

4. Dictionary of the Arabic words, and the oral and visual messages.

5. Graphic File containing formated graphic figures.

6. The primer Arabic Teaching program.

The video display processor VDP 10 provides a simple interface between the MP and a raster-scan color TV. The VDP interfaces to the MP using the 8-bit bidirectional data bus 32, the control lines RD1 and WR1, and address lines 33. Through this interface the MP conducts four operations;
(1) write data bytes to the display RAM 12
(2) read a data byte from the display RAM
(3) write to the internal registers of the VDP
(4) read the status registers of the VDP.

The VDP utilizes a dedicated dynamic display RAM 12 to store the screen graphics and color information. The VDP communicates with the display Dynamic RAM through the Data Output DO lines 27, Data In/Address DA 27 lines, and the control lines ROW, Address Select RAS 23, Column Address Select CAS 24, and the Read/Write line R/W 25. The VDP also generates all the necessary signals to refresh the dynamic RAM.

The VDP 10 contains means to generate the TV horizontal and vertical synchronization signals, color decoder, and a video logic to provide a composite color video signal. The composite video signal 28 is fed to the radio frequency RF modulator 13. This RF modulator accepts also the sound signal from the Audio Amplifier AA and provides the standard NTSC (or PAL) TV signals for channel 3 (or 4).

The internal registers of the VDP 10 enable the MP to perform the following operations:
1. Configure the VDP to the required mode of operation.
2. Define the base address of the various working tables in the display RAM.
3. Select and change the background color.
4. Enable/blank the active display area.
5. Choose the sprites size.

The VDP is normally configured to operate in the graphics mode or pixel-map mode. There are two tables which occupy the major part of the RAM area; the pixel pattern map, and the color information table. There is also the sprite pattern generation table SPGT and sprite attribute table SAT. Sprites are special animation patterns which provide smooth motion and multilevel pattern overlay. The location of a sprite is defined by the top left hand corner of the sprite pattern. The sprite can easily be moved pixel-by-pixel by redefining the sprite origin. This provides a simple and powerful method of quickly and smoothly moving special patterns. Sprites can be configured in 8×8 pixels, 16×16 or 32×32 pixels. The SPGT contains the sprites dot pattern, while the SAT contains the position of the sprites and their colors.

When power is switched on, the Control and Timing Circuit in the MP resets the program counter, and the main subblocks of the MP, and starts execution of the main program residing in the ROM 11. The control and Timing Circuit of the MP provides all the signals for execution and data transactions between the MP and the other support chips and the external modules. In general, the internal operatons of the MP as the accumulator, conditions flags, Arithmetic Logic Unit ALU, stack pointer, and the working registers are all standard and need not be repeated here. The MP writes to the support chips by sending the address to the common address bus, then the data is transferred to the data bus, followed by asserting the $\overline{WR}$ line to the low level. The active period of the $\overline{WR}$ signal (or the $\overline{RD}$ signal) depends on the clock used to run the MP. In our application a relatively low cost low speed MP should be adequate to allow the use of cheap slow memories and other low cost support chips. However, too slow clocks may cause an untolerable delay to display graphics and to change the information on the screen.

After the device is turned on, and the MP is initialized, the MP configures the VDP 10 by writing to its internal registers; clears out display RAM 12, and fills the color table, the Sprite Pattern Generation Table SPGT, and the Sprite Attribute Table SAT. The MP then checks for the external module by reading two specific memory bytes in the external module and compares them with another two prestored bytes. If matching is successful, the MP starts execution of the teaching software in the external module. If matching is not successful, the MP executes the primer teaching software in the resident memory.

Anyway, whether the device executes the resident software or the module software, the device displays on the screen a log-on message, which is normally the title of the course. The log-on message is accompanied by its oral voice. The device also may display the syllabus of the course, or some explanatory instruction. The MP then continuously reads Port P1 and checks the status of the [GO] key until this key is depressed. The device then enters the Level Node as explained before.

The generation of the visual or oral messages is performed in several hierarchical levels. The bottom level consists of the character generation files, and the allophone generation file. The character generatiion files contain the characters dot pattern. In this embodiment two Arabic fonts, and three letter sizes will be used; small size (Font 1), medium size (Font 2), and large size.

The large size is generated by magnifying the medium size by a factor of two by software. However, the small and the medium size fonts are generated by two sperate files, the Small Character Generation File SCGF, and the Medium Character Generation File MCGF. Some of the Arabic character patterns are given for illustration in FIGS. 3 to 8.

Each character is identified by a 7-bit code, like the standard ASCII code in the American system. The address of the character generation matrix in the character generation file is obtained by means of a Code Address Conversion Table. There are two such tables, the Small Character Code Address Table SCCAT, and the Medium Character Code Address Table MCCAT. The software takes the character code and performs one-bit left shift. The resulting 8-bits are used as the least significant address byte of a composite address. The most significant byte of this address is the base address of the character code address Table. Each of the character Code Address Tables occupy about one memory page (256 bytes), and must start at a page boundary. The data stored in these tables in the form of fixed length data segments. Each segment is exactly two bytes. There is one segment for each character code. The format of a data segment is shown in FIG. 10.

The most significant 4 bits of the data segment represent a code for the character attribute, for example;
regular character
tashkeel (a modifier sign) character over letters
tashkeel character under letters
numeric character or symbol
control character
character is not defined
The least significant 12 bits are the address of the character dot matrix in the Character Generation Files.

The next upper hierarchical level is the Arabic Word File AWF. The Arabic Word File consists of variable length data segments, each segment corresponds to one word. The format of the data segments is shown in FIG. 11.

The first byte of a data segment is an Identification code for the word to differentiate between such cases as;

the word has no taskkeel at the end
the word has tashkeel at the end
the word is a prefix
the word is a suffix
the word is a genetic root
the word is only the generic sound of a verb
whether the voice is generated by rules or Allophone string etc.

The second byte in the data segment contains the number of characters in the word. If the number is zero, the word code field will be deleted. Such case is used to generate sound effects with no visual correspondence.

Following the second byte of the segment is the string of character codes of the word. The field ends by a special control byte. The next field contains the Allophone/syllables code string of the word. Finally, the data segment ends by an End of Segment Field EOS which consists of two control bytes as (FF) hex. If the word sound can be generated by rules, the Allophone/syllables code string is deleted. Each Allophone is represented in the Allophone/syllables field by a binary code in the same way as the characters code. The code is used here to access the LPC coefficients of the allophone from the LPC file by the help of an Allophone Code Address TAble ACAT.

The Allophone/syllables code is left shifted and concatenated with the base address of the ACAT. The constructed address is used to fetch a data segment from the ACAT. The data segment, FIG. 12, of the ACAT consists of a 13 bit address field and a 3 bit Allophone Attribute code field. The identification field indicates the following cases;

if the allophone is to be modified according to its position with respect to the neighbor allophones
whether the syllables is fundamental or composite
the allophone is a repetition of another allophone as long vowels
sound is generated by doubling the given speech segments of the allophone
sound is produced by repeating the entire LPC data segment of the allophone etc.

The 13 bit address points to the starting address of the data segment containing the LPC coefficients of the allophone in the LPC File LPCF.

Each data segment consists of one or more speech frames and each speech frame consists of 10 quantized coefficients stored sequentially in the speech frame. A speech frame corresponds normally to 20 msec. of speech voice. Shortly before the VSP finishes processing a given frame, the busy line 5 goes low and interrupts the MP to request another frame data. The MP then sends another set of coefficients (the next speech frame) and so on until the end of the allophone.

The upper level of data structure consists of two main files; The Oral Messages File OMF, and the Visual Messages File VMF. The VMF consists of variable length data segment. Each data segment corresponds to one screen message or a line of text.

The data structure of the segments is shown in FIG. 13. The data segment starts by a Header field of two control bytes. The control bytes may be taken to be (FF) hex. Following the Header is the Features field which consists of 4 bytes. The first byte indicates the size of the line on the screen as small, medium or large. Bytes 2, 3 and 4 shows the colors of the line background, the letters and the tashkeel respectively. Following the Feature field is a string of two-byte word address fields which constitutes the screen message. Each address field contains the address of a word in the Arabic Word File AWF as shown in FIG. 13. However, if $b_{14}$ is 1, then the color of each individual character in the word may be independently specified. In this case each address field is followed by a byte specifying the number of characters in the word, and the subsequent bytes contain the color code for the corresponding character.

The oral Message File OMF consists simply of a header field as the case of the VMF, then an identification byte or attribute byte, then a sequence of two-byte address fields of the words constituting the message.

Storing color graphics information normally requires large amount of memory space. In this invention we use a very compact format to store the graphics information. Graphics patterns are stored in a Graphic File GF. The screen consists of pixels, and each square of $8 \times 8$ pixels is called a Cell. The Following format ensures that only those cells which contain non-trivial information will be stored. Each graphic pattern will be stored in a variable length data segment. The format of a OS is shown in FIG. 14. The first byte gives the picture frame size in cells, e.g. 4 cells by 3 cells. The first nibble contains the number 4 in binary, and the second byte contains the color information. The first nibble contains the color number of the background or the off pixels and off cells. If this nibble contains (0000) binary, then each cell or pixel may have a unique color. The next field is the Frame mask. The Frame mask bytes show which cells inside the graphics frame contain pertinent information. For example, suppose that the frame size is 3 by 4 cells, the frame Mask Field then consists of 3 bytes as follows:

| 0 | 1 | 0 | 0 | x | x | x | x |
| 0 | 1 | 1 | 0 | x | x | x | x |
| 1 | 1 | 0 | 1 | x | x | x | x |

The x sign indicates DO-NOT care bits. The 1 bits indicate the position of those cells relative to the graphics frame which contain graphics information. The O or the off cells are transparent or contain only a background color. Following the Cell Mask is the Cell Mask Field for the on-cells only taken from left to right and row by row. The Cell Mask consists of either 8, 9 or 17 bytes subfield for each on-cell. If the entire color of the picture is defined in the second byte of the graphics attribute field, then each Cell Mask field will be 8 bytes. If the color is not defined, the cell color may be uniquely defined, however, the Cell Mask of each cell consists now of 9 or 17 bytes. The first byte indicates the 1 and 0 colors of the pixels of this cell, then the next 8 bytes give the pixel pattern as usual. If the first byte again is (00) hex then the color of each row of pixels in the cell can be defined.

In this case additional 16 bytes mask will be needed, one byte defines the colors of the 1 and 0 pixels, the next byte gives the dot pattern of the a row. Thus a total of 16 bytes and one IO byte will be needed to fully describe a cell. Subroutines are also provided to magnify the graphic patterns by 2, 3 and 4 times. The position of a figure on the screen is determined by software, thus a given pattern can still be displayed at different positions on the screen with even possible different magnifications.

It should be clear to the reader that the detained description and specific examples herein before, while indicating a preferred embodiment of the invention are given by way of illustration only since various changes and modifications within the spirit and scope of the invention may become apparent to those skilled in the art of computer hardware and software.

A possible low cost embodiment can be implemented using the following components:

The microprocessor 6508 with internal memory, I/O port and 16 bit addressing capability without bus multiplexing.

The Texas Instrument (trademark) voice synthesizer TMS5220A.

The Texas Instrument (trademark) TMS 9918A as a video display processor (for the NTSC system)

8-4116-2 dynamic memories for the display RAM.

Astec TV RF modulator.

Standard TTL logic for SCL.

The standard 16K×8 ROM (ROM version of 27128) for the resident program memory.

Another cheap hand-held battery operated product can be implemented using a small dot matrix liquid crystal display LQD. In this case, the VDP and the display RAM section will be replaced by a small static display memory and driving logic for the LCD display. In another design, the external software can be provided on cassettes or cartridges. In this case the device requires an adequate internal RAM, and the programs are loaded in through a cassette interface. In a more sophisticated hardware, the device may include a floppy disk or magnetic bubble memory as software storage media. The device also may be supplied with voice input capability and Speech Recognition Logic and software to achieve full interactive teaching capability.

I claim:

1. A teaching device for Arabic language and Qur'anic recitation which comprises:
    (a) an optical display means;
    (b) an interface means connected to said optical display means;
    (c) a first storage media for storage of Arabic character patterns for use in generation of characters;
    (d) a second storage media for coded Arabic allophones/syllables and words;
    (e) a first storage means for coded words and coded sounds;
    (f) a second storage means for teaching programs, the programs including limited-choice operation commands and options in a programmed hierarchy, adapted to lead a student through progressing levels in accord with the student's response to a series of partially randomized questions and prompts, utilizing interactive evaluation means;
    (g) an input means whereby selection of said operation commands is achieved;
    (h) a voice synthesis means and means for speech and sound production;
    (i) a computer means for coupling the said optical display means to said input means, to said first and second storage media, to said first and second storage means, and to said voice synthesis means; and
    (j) an external storage means for operating software having an interface with said computer means.

2. A teaching device according to claim 1 wherein said optical display means is a video terminal, a black-and-white television, or a color television set.

3. A teaching device according to claim 2 wherein said interface means to said optical display means is compatable with the European T.V. PAL system or the standard American NTSC system.

4. A teaching device according to claim 1 wherein the optical display means is a dot matrix liquid crystal display, and the voice synthesis means comprises a built-in speaker.

5. A teaching device according to claim 1 wherein said external storage means is one or more solid state Read-Only-Memories.

6. A teaching device according to claim 1 wherein the external storage means comprises a cassette, a disk, a floppy disk, or a magnetic bubble memory.

7. A teaching device according to claim 1 wherein the input means comprises one or more of the following devices: a keyboard, a light pen, a joystick, a mouse, or a touch screen.

8. A teaching device according to claim 7 wherein the input means is a remote, hand-held keyboard incorporating means to move pointers or objects up, down, right, or left on the screen, means to command the teaching device to start actions, to command the teaching device to pause or quit actions and one or more general purpose keys adapted to be programmed to generate others of said operation commands and options.

9. A teaching device according to claim 8 in which the remote keyboard comprises means to communicate with the other elements of the teaching device through one or more of the following means: a cable, ultrasonic signals, or electromagnetic wave signals.

10. A teaching device according to claim 1 comprising firmware and hardware means incorporating a set of rules of pronunciation of the Arabic language adapted to be used to generate a string of allophones for Arabic words from a coded input.

11. A teaching device according to claim 1 wherein said optical display means includes variable-sized character units, allowing high resolution display of Qur'anic script and modifiers.

12. A teaching device according to claim 1 comprising voice input means, means for encoding input speech, storage means for coded words and sentence patterns or templates, and a software means for word recognition and sentence recognition.

13. A system for teaching of Arabic language and Qur'anic recitation, comprising: a microprocessor, a quantity of Random Access Memory accessible to the microprocessor, a video display means, a video display processor interfacing the microprocessor with the video display means, an audio output means, a voice synthesizer processor adapted to accept the linear prediction coding coefficients of allophones and tones to provide an audio signal, a teaching program accessible to the microprocessor, the teaching program driven by menus and limited-option decision nodes, and a Read Only Memory containing at least
    (1) an operating system, (2) a character pattern file containing variable-dimension matrices of the dot patterns of the Arabic characters and other symbols, (3) an Arabic allophone/syllable file including linear prediction coding coefficients (4) a dictionary file containing Arabic words, and oral and visual messages, (5) a graphics file, (6) a primary hierarchical Arabic teaching program and a non-alphanumeric input means having just sufficient input options to choose from said menus and among said limited options at the decision nodes of either the primary teaching program or the extended teaching program.

14. A system as recited in claim 13 wherein the input keyboard has no more than 8 keys.

15. A system as recited in claim 13 further comprising a character code address table containing data segments including a character attribute code and character pattern addresses associated with the character pattern file.

16. A system as recited in claim 13 further comprising an Arabic word file containing variable length data segments.

17. A system as recited in claim 16 in which each variable length data segment contains an identification field, a character string field, a control byte, an allophone string field which may be empty (in which case the bytes are not allocated), and an end of segment marker.

18. A system as recited in claim 17 wherein said read only memory contains a collection of rules for arabic pronunciation.

19. A system as recited in claim 18 wherein the identification field is adapted to indicate that the voicing of the corresponding word follows the rules of pronunciation contained in the Read Only Memory and that no allophone reconstruction is necessary.

20. A system as recited in claim 13 further comprising an oral message file.

21. A system as recited in claim 13 further comprising a visual messages file.

22. A system as recited in claim 13 wherein the video display means is capable of several coded colors and is divided into cells and frames, the system further comprising a memory conserving graphics file containing variable length graphics data segments, the segments comprising a frame size byte, a background color code byte, a frame mask indicating which cells in a frame contain non-trivial information, a cell mask field for each cell which contains information, each cell mask field having an on/off color code byte and a pixel pattern field.

* * * * *

UNITED STATES PATENT AND TRADEMARK OFFICE
CERTIFICATE OF CORRECTION

PATENT NO. : 4,710,877

DATED : December 1, 1987

INVENTOR(S) : Moustafa E. Ahmed

It is certified that error appears in the above-identified patent and that said Letters Patent is hereby corrected as shown below:

Column 2, between lines 55 and 56 insert --Tables 1 and 2.

Column 2, between lines 65 and 66 insert --Table 3--.

Column 5, after line 68 insert Tables 4a-4c.

Signed and Sealed this

Twenty-third Day of August, 1988

Attest:

DONALD J. QUIGG

Attesting Officer

Commissioner of Patents and Trademarks

TABLE 1
The Arabic Letters

| letter script | letter name | letter name | English symbol | English words having similar sounds |
|---|---|---|---|---|
| ا | الف | Alif | A | *** |
| ب | باء | Ba | B | bless |
| ت | تاء | Ta | T | true |
| ث | ثاء | Tha | Th | think |
| ج | جيم | Jim | J | judge |
| ح | حاء | Ha | H | *** |
| خ | خاء | Kha | KH | *** |
| د | دال | Dal | D | dear |
| ذ | ذال | Dhal | Dh | this |
| ر | راء | Ra | R | road |
| ز | زاي | Zay | Z | is |
| س | سين | Sin | S | safe |
| ش | شين | Shin | Sh | show |
| ص | صاد | Sad | Ṣ | *** |
| ض | ضاد | D | Ḍ | *** |
| ط | طاء | Ta | Ṭ | *** |
| ظ | ظاء | Za | Z | *** |
| ع | عين | ayn | | *** |
| غ | غين | hayn | GH | *** |
| ف | فاء | Fa | F | free |
| ق | قاف | Qaf | Q | *** |
| ك | كاف | Kef | K | care |
| ل | لام | Lam | L | light |
| م | ميم | Mim | M | moon |
| ن | نون | Nun | N | nice |
| ه | هاء | Ha | H | health |
| و | واو | Waw | W | wealth |
| ي | ياء | Ya | Y | youth |
| ء | همزة | Hamzah | | *** |

\*\*\* These sounds have no equivalent sounds in English and have to be learned by imitating the native speaker of Arabic.

Some Forms of the Arabic Letters

Table 2

| | 1 | 2 | 3 | 4 | | | 1 | 2 | 3 | 4 |
|---|---|---|---|---|---|---|---|---|---|---|
| a | ا | أ | إ | | ta | ط | | | |
| b | ب | ب | | | za | ظ | | | |
| t | ت ت | ت | | | nn | ع | ء | | |
| th | ث ث | ث | | | gh | غ | غ | غ | غ |
| j | ج | ج | | | p | ف | | | |
| ha | ح | ح | | | q | ق | ق | ق | ق |
| kh | خ | خ | | | k | ك | ك | ك | |
| d | د | | | | l | ل | ل | ل | |
| zh | ذ | | | | m | م | م | م | |
| r | ر | | | | n | ن | ن | | |
| z | ز | | | | h | ه | ه | ه | ه |
| s | س | س | | | o | و | | | |
| sh | ش | ش | | | y | ي | ي | ي | ي |
| sd | ص | ص | | | aa | ء | ء | ء | ء |
| dh | ض | ض | | | lu | لا | | | |
| | | | | | ta | ة | ة | | ة |

Signs of the Arabic modifiers

| letters | modifier | |
|---|---|---|
| over | ´ | 1 |
| under | . | 2 |
| over | ٔ | 3 |
| over | ○ | 4 |
| over | ش | 5 |
| under | ش | 6 |
| over | ۿ | 7 |
| over | ≈ | 8 |
| Under | ≡ | 9 |
| over | ٔٔ | 10 |

Table 3

TABLE 4

English-Arabic Allophones

| SILENCE | | | |
|---|---|---|---|
| /PA1/ | | 10m sec | before /BB/, /DD/, /GG/, and /CH/ |
| /PA2/ | | 30m sec | before /BB/, /DD/, /GG/, and /CH/ |
| /PA3/ | | 50ms | before /PP/, /TT/, /KK/, and /CH/, and before words |
| /PA4/ | | 100ms | between clauses and sentences |
| /PA5/ | | 200ms | between clauses and sentences |
| Short Vowels | | | |
| /IH/ | * | 50ms | sit, stranded |
| /EH/ | * | 50ms | end, extend |
| /AE/ | * | 80ms | Hat, extract |
| /UH/ | * | 70ms | Book, full |
| /AO/ | * | 70ms | Song, talk |
| /AX/ | * | 50ms | succeed, instruct |
| /AA/ | * | 60ms | Hot, cotton |
| /AH/ | *△ | 80ms | after ظ، ض، غ، خ، ر، ط، ق |
| Long Vowels | | | |
| /IY/ | | 170ms | see, people |
| /EY/ | | 200ms | great, beige |
| /AY/ | | 170ms | sky, tray |
| /OY/ | | 290ms | boy, toy |
| /UW1/ | | 60ms | after clusters with YY: computer |
| /UW2/ | | 170ms | two, food |
| /OW/ | | 170ms | zone, snow |
| /AW/ | | 250ms | sound, out, mouse |
| /AW1/ | △ | 250ms | ضوء |
| /AH1/ | △ | 250ms | ظلام، منال |
| R-Colored Vowels | | | |
| /ER1/ | | 110ms | letter, interrupt |
| /ER2/ | | 210ms | burn, bird |
| /OR/ | | 240ms | fortune, store |
| /AR/ | | 200ms | alarm, farm |
| /YR/ | | 250ms | clear, hear |
| /XR/ | | 250ms | hair, repair |
| /UR/ | △ | 120ms | نور |
| /AR1/ | △ | 120ms | دار |

| Voiced Fricatives | | | |
|---|---|---|---|
| /VV/ | | 130ms | vest,        eve |
| /DH1/ | | 140ms | word-initial position: this, they |
| /DH2/ | | 180ms | word final and between vowels |
| /ZZ/ | | 150ms | zoo,        phase |
| /ZH/ | | 130ms | beige,        pleasure |
| /ZH1/ | △ | 120ms | جاء , يتجر ؛ جيم |
| /ZH2/ | △ | 140ms | |
| /ZH3/ | △ | 100ms | ذالك - ذأب |
| /ZH4/ | △ | 150ms | ظ. end of word |
| /ZH5/ | △ | 110ms | middle and beginning |
| /GH/ | △ | 130ms | غريب , ع |
| /KH/ | △ | 130ms | خرج - فخ |
| Affricatives | | | |
| /CH/ | | 150ms | church,        china |
| /JH/ | | 100ms | dodge,        judge |
| /JH1/ | △ | 150ms | جيم مشدودة , فجّان |
| /JH2/ | △ | 150ms | end of word   وقف عند جيم مشدودة فج |
| Nasal | | | |
| /MM/ | | 180ms | milk |
| /MM1/ | △ | 250ms | غنه طويلة رحمن , كم بن عذب |
| /MM2/ | △ | 150ms | غنه قصيرة |
| /NN1/ | | 170ms | before front and central vowels: AX, AW, AY, UW; final clusters: earn |
| /NN2/ | | 140ms | before back vowels: UH, OW, OY, OR, AR, AA |
| /NN3/ | △ | 250ms | Tanween |
| /NG/ | | 200ms | anger,        stranger |
| Voiceless stops | | | |
| /PP/ | | 150ms | pay,        trip, ample |
| /TT1/ | | 80ms | final clusters before SS: tests, its, also in part |
| /TT2/ | | 100ms | all other positions, street, toso |
| /TT3/ | △ | 150ms | ط unvoweled  ط ساكنة |
| /TT4/ | △ | 100ms | ط مفتوحه أو مضمومه |
| /TT5/ | △ | 100ms | ط مكسورة |
| /TT6/ | △ | 100ms | ط ساكنة تعلق في التشديد |
| /KK1/ | | 120ms | before front vowels, and initial clusters cute, scream |
| /KK2/ | | 140ms | speak,        task |
| /KK3/ | | 80ms | before back vowels, crane, clown, comb |
| /KK4/ | △ | 80ms | ق و ف |
| /KK5/ | △ | 120ms | ساكنة مقلقلة نفق |
| /KK6/ | △ | 60ms | ساكنة غير مقلقلة في التشديد |
| /KE/ | △ | 150ms | ق syllable |
| /AA1/ | △ | 80ms | همزة ساكنة |
| /AA2/ | △ | 60ms | ضوء , منوة , ضوي |

TABLE 4.b

| Voiced Stops | | | |
|---|---|---|---|
| /BB1/ |   | 40ms | rib,    brown |
| /BB2/ |   | 60ms | initial position before vowel |
| /BB3/ | △ | 80ms | سَقَلْتَهْ    final positions |
| /DD1/ |   | 50ms | final position could, end |
| /DD2/ |   | 80ms | down,   drain |
| /DD3/ | △ | 80ms |   |
| /DD4/ | △ | 80ms | end of word    قَرْ |
| /DD5/ | △ | 60ms | in Tashdeed and clusters    خامِنْ |
| /DD6/ | △ | 70ms | مَنْ , مَنُو |
| /GG1/ |   | 80ms | before high front vowels: YR, IY, IH, EY, EH, XR |
| /GG2/ |   | 80ms | before high back vowels: UW, UX1, OW, AX green |
| /GG3/ |   | 120ms | peg,   anger |
| Resonants | | | |
| /WW/ |   | 150ms | we,   wool |
| /RR1/ |   | 130ms | reed,   ray |
| /RR2/ |   | 60ms | initial clusters brown, crane |
| /LL/ |   | 80ms | like,   hello |
| /EL/ |   | 130ms | little,   angle |
| /LL1/ | △ | 80ms | اللَّهِ |
| /YY1/ |   | 90ms | computer |
| /YY2/ |   | 130ms | yes,   yo-yo |
| /WW1/ | △ | 250ms | لَوْ بُو |
| Voiceless Fricatives | | | |
| /FF/ | * | 110ms | feet,   frog |
| /TH/ | * | 130ms | tooth |
| /SS/ | * | 60ms | test |
| /SH/ |   | 200ms | ship |
| /HH1/ |   | 90ms | he    before front vowels |
| /HH2/ |   | 130ms | hoe   before back vowels |
| /HH3/ | △ | 70ms | short ح as in Tashdeed |
| /HH4/ | △ | 120ms | حَ |
| /AN1/ | △ | 70ms | غَ |
| /AN2/ | △ | 120ms | غ , ع , ع̄ |
| /SS1/ | △ | 70ms | صَ   First letter in Tashdeed |
| /SS2/ | △ | 120ms | صِّ , صُّ |
| /SS3/ | △ | 80ms |   |
| /WH/ |   | 150ms | whig |

\* These Allophones can be doubled

△ Arabic Allophones only

1- The duration of some Allophones as only suggested value, and can be slightly changed without appreciable perception.

2- The common Allophones have been assigned durations according to the English language practice. However, for Arabic language, some Allophones may be given a second period.

TABLE 4.C